3,813,453
PREPARATION OF 1-BUTENE
Lawson G. Wideman, Akron, Ohio, assignor to The Goodyear Tire & Rubber Company, Akron, Ohio
No Drawing. Filed Oct. 2, 1972, Ser. No. 294,146
Int. Cl. C07c 3/10
U.S. Cl. 260—683.15 D                       3 Claims

ABSTRACT OF THE DISCLOSURE

Ethylene is dimerized to butene-1 by using a catalyst prepared by reacting tungsten hexachloride or tungsten hexabromide with aniline or an alkyl substituted aniline and then adding an alkyl aluminum halide.

---

This application is directed to a process of dimerizing ethylene to produce a high purity 1-butene.

Ethylene has been previously dimerized to form butenes by a variety of processes. For instance, alkyl phosphenes have been used along with nickel salts to dimerize ethylene. However, in this instance, a preponderance of 2-butene was produced. Ethylene has also been dimerized with a cobalt-active carbon catalyst. In this case, a mixture of 1- and 2-butenes was produced. Further, when a catalyst such as about 4 percent nickel on silica-alumina is employed to dimerize ethylene, a mixture of 1- and 2-butenes is produced. Many other catalyst systems for the dimerization of ethylene are known, however, invariably these prior processes produce a mixture of 1- and 2-butene or a preponderance of 2-butene.

Butene-1 has also been prepared by a variety of dehydrogenation processes. Further, 1-butene may also be prepared by the dehydrohalogenation of normal butyl halides or by the dehydration of butyl alcohol. However, these processes usually lead to a major portion of 2-butene being formed.

A process for the preparation of 1-butene by the dimerization of ethylene with a titanium catalyst system is known, however, the conversion of ethylene is very low, less than 1000 moles of ethylene per mole of titanium per hour.

It is, therefore, an object of this invention to provide a process whereby a high purity 1-butene may be produced at high conversiton levels by the dimerization of ethylene. It is also an object to provide a process whereby 1-butene, in a purity greater than about 98 percent with no more than about 1 percent of 2-butene and no more than about 1 percent hexenes or higher molecular weight compounds, is produced by ethylene dimerization. It is also an object to provide a process whereby high conversions of ethylene to 1-butene with relatively small amounts of catalyst per hour can be effected.

According to this invention, ethylene is dimerized by exposing ethylene to a catalyst system comprising (1) a tungsten salt selected from the group consisting of tungsten hexachloride and tungsten hexabromide, (2) an aluminum alkyl halide selected from the group consisting of alkyl aluminum dichlorides, alkyl aluminum dibromides, dialkyl aluminum chlorides, dialkyl aluminum bromides, alkyl aluminum sesquichlorides and alkyl aluminum sesquibromides, in which the alkyl groups contain from 1 to 6 carbon atoms and (3) a ligand of the formula:

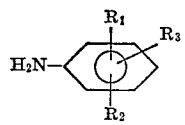

wherein $R_1$, $R_2$ and $R_3$ are selected from the group of hydrogen and alkyl radicals containing from 1 to 4 carbon atoms.

The process being extremely effective in the conversion of ethylene to 1-butene, it is preferred to employ an inert solvent system to help in removal of the exothermic heat of the reaction. Almost any aromatic or aliphatic hydrocarbon or inert substituted hydrocarbon solvent may be employed so long as the solvent does not contain ethylenic unsaturation and remains a liquid under the operating conditions. It is usually preferred, however, to employ benzene or chlorobenzene as the inert solvent.

The reaction pressure may range broadly from about C. to about 75° C. However, it is preferred to employ temperatures ranging from about 30° C. to about 50° C.

The reaction pressure may range broadly from about 1 atmosphere to several hundred atmospheres of ethylene pressure. Usually, the greater the pressure, the greater the efficiency of the catalyst. However, it is preferred to operate to about 25 to about 75 atmospheres.

The reaction conditions utilizing the invention of this application require, for the best results, anhydrous and oxygen-free environments.

One of the catalyst components of the catalyst system employed in this invention, as indicated, consists of tungsten hexachloride or tungsten hexabromide. These tungsten salts should, of course, be as pure as possible and free from moisture.

Another of the components of the catalyst system may be described as a nitrogen containing ligand of the formula:

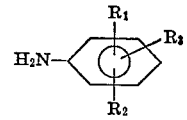

wherein $R_1$, $R_2$ and $R_3$ are selected from the group of hydrogen and alkyl radicals containing from 1 to 4 carbon atoms. Representative of such ligands are aniline; the alkyl substituted anilines such as methylaniline, ethylaniline and butylaniline; the dialkyl substituted anilines such as dimethylaniline and diethylaniline; the trialkyl substituted anilines such as trimethylaniline and triethylaniline. The alkyl groups, when present are in the 2,3, 4, 5 and/or 6 positions. It is prefered to use 2,6-dimethylaniline.

The other catalyst component is an organoaluminum compound of the formulae:

or

wherein $n$ is a whole number of 1 or 2, R is an alkyl radical containing from 1 to 6 carbon atoms and X is a chlorine or bromine radical. Representative of such compounds are ethylaluminum dichloride, ethylaluminum dibromide, diisopropylaluminum chloride, diethylaluminum bromide, isobutylaluminum dichloride, ethylaluminum sesquibromide, ethylaluminum sesquichloride, butylaluminum chloride, isoamylaluminum chloride, hexylaluminum bromide, dibutylaluminum chloride, diisobutylaluminum bromide and dihexylaluminum chloride. Of these, diethylaluminum chloride is preferred.

The mole ratio of the ligand (N) to the tungsten hexahalide (W) should range from about 1/1 to about 3/1, with a mole ratio of N/W of about 2/1 being more preferred.

The mole ratio of the aluminum alkyl halide (Al) to the tungsten halide (W) should range from about 5/1 to about 200/1, with a mole ratio of Al/W of about 20/1 to about 80/1 being more preferred.

The amount of total catalyst employed to dimerize ethylene to form 1-butene can vary widely. Expressed in terms of moles of ethylene to moles of tungsten employed to form the catalyst, the range may be said to be from about 20/1 to about 300,000/1 or higher. However, it should be noted that the greater the pressure, the greater efficiency the catalyst has in converting ethylene into 1-butene. The pressure referred to is ethylene pressure, not pressure of an inert gas, for instance. It will be observed that the catalyst of this invention is very effective in converting ethylene into 1-butene in that in the examples, 176,000 and 184,000 moles of ehylene were converted per mole of tungsten per hour.

As indicated previously, the mole ratio of the ligand to the tungsten hexahalide should range from about 1/1 to about 3/1 with a mole ratio of N/W of about 2/1 being preferred. It is desirable in the practice of this invention to pre-react the particular ligand with the particular tungsten hexahalide selected. This is done by merely reacting the ligand and the tungsten salt together in a small portion of the inert solvent, preferably chlorobenzene, using care to exclude both air and moisture. Subsequently this partially preformed tungsten salt-ligand product is then mixed with the aluminum alkyl halide compound to form the complete catalyst.

The invention is further illustrated by reference to the following examples which are intended to be representative rather than restrictive of the scope of this invention.

EXAMPLE I

This experiment was conducted in a one liter autoclave equipped with temperature control devices and means for maintaining constant temperatures. To the autoclave was added 100 milliliters of benzene. To the autoclave was added 0.031 millimoles of a mixture of tungsten hexachloride and 2,6-dimethylaniline, which had previously been mixed in a minimum amount of chlorobenzene and refluxed for about one hour at a molar ratio of 1/2. To the autoclave there was then added 2.5 millimoles of diethyl aluminum chloride. At that time the autoclave and its contents were weighed. Ethylene was added to the autoclave. The reaction was continued for a period of one hour while the pressure was being maintained at 27 atmospheres by constantly adding additional ethylene. The temperature was maintained at 40° C. At the end of a one hour period, the reaction was quenched with 5 milliliters of water. The autoclave and its contents were again weighed and the products were subjected to gas chromatography analysis. From a combination of the gas chromatography analysis and the weight increase, it was determined that 176,000 moles of ethylene per mole of tungsten in the catalyst per hour had been converted, and the selectivity to 1-butene was 92 percent. One percent of 2-butene was found and 2 percent of heavies equal to or greater than $C_6$ olefins was obtained. There was no trace of butadiene detected.

EXAMPLE II

Another experiment was conducted under the same operating conditions of Example I except that the ethylene pressure was held constant at 34 atmospheres. It was determined that 184,000 moles of ethylene per mole of tungsten per hour had been converted. A selectivity to 1-butene of 98 percent was obtained and only about 1 percent of heavies equal to or greater than $C_6$ olefins was detected.

While certain representative embodiments and details have been shown for the purpose of illustrating the invention, it will be apparent to those skilled in this art that various changes and modifications may be made therein without departing from the spirit or scope of the invention.

What is claimed is:

1. In a process for the preparation of 1-butene which comprises dimerizing ethylene by contacting ethylene with a catalyst comprising (1) a tungsten salt selected from the group consisting of tungsten heyachloride and tungsten hexachloride and tungsten hexabromide, (2) an aluminum alkyl halide selected from the group consisting of alkyl aluminum dichloride, alkyl aluminum dibromides, dialkyl aluminum chlorides, dialkyl aluminum bromides, alkyl aluminum sesquichlorides and alkyl aluminum sesquibromides, in which the alkyl groups contain from 1 to 6 carbon atoms and (3) a ligand of the formula:

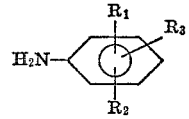

wherein $R_1$, $R_2$ and $R_3$ are selected from the group of hydrogen and alkyl radicals containing from 1 to 4 carbon atoms in which the mole ratio of the ligand to the tungsten halide ranges from about 1/1 to about 3/1 and the mole ratio of the aluminum alkyl halide to the tungsten halide ranges from about 5/1 to about 200/1 and in which the temperature ranges from about 25° C. to about 75° C. and in which the reaction pressure is about 25 to about 75 atmospheres, the improvement which comprises prereacting the ligand and the tungsten halide together prior to contact with the aluminum alkyl halide.

2. A process according to claim 1 in which the tungsten salt is tungsten hexachloride, the aluminum alkyl halide is aluminum diethyl chloride and the ligand is 2,6-dimethylaniline.

3. A process for the preparation of 1-butene which comprises dimerizing ethylene by contacting ethylene with a catalyst comprising (1) tungsten hexachloride, (2) aluminum diethyl chloride and (3) 2,6-dimethyl aniline, in which the tungsten hexachloride and the 2,6-dimethyl aniline are prereacted at a mole ratio of about 2/1, and in which the mole ratio of the aluminum diethyl chloride to the tungsten hexachloride ranges from about 20/1 to about 80/1 and in which the reaction pressure is about 25 to about 75 atmospheres and the reaction temperature ranges from about 30° C. to about 50° C.

References Cited
UNITED STATES PATENTS 3,318,860　5/1967　Eichenbaum ＿＿＿＿＿＿ 252—429 B
3,558,518　1/1971　Zuech ＿＿＿＿＿＿＿＿ 252—429 B PAUL M. COUGHLAN, JR., Primary Examiner U.S. Cl. X.R.

252—429 B

PO-1050
(5/69)

UNITED STATES PATENT OFFICE
CERTIFICATE OF CORRECTION

Patent No. 3,813,453         Dated May 28, 1974

Inventor(s) Lawson G Wideman

It is certified that error appears in the above-identified patent and that said Letters Patent are hereby corrected as shown below:

Col 1, line 47, "conversiton" should read --conversion--.

Col 2, line 14, "pressure" should read --temperature--.

Col 2, line 14, "broadly" should be deleted.

Col 2, line 14, after "about" should be inserted --25°--.

Col 2, line 14 should read as follows:

The reaction temperature may range from about 25°

Col 2, line 21, "to", second occurrence should read -- at --.

Signed and sealed this 15th day of October 1974.

(SEAL)
Attest:

McCOY M. GIBSON JR.
Attesting Officer

C. MARSHALL DANN
Commissioner of Patents